United States Patent [19]

Arackellian

[11] Patent Number: 5,541,419
[45] Date of Patent: Jul. 30, 1996

[54] SYMBOLOGY READER WTH REDUCED SPECULAR REFLECTION

[75] Inventor: Kevork G. Arackellian, Everett, Wash.

[73] Assignee: Intermec Corporation, Redmond, Wash.

[21] Appl. No.: 215,133

[22] Filed: Mar. 21, 1994

[51] Int. Cl.$^6$ ........................................... G06K 7/10
[52] U.S. Cl. ........................... 250/566; 250/568; 250/225; 235/470
[58] Field of Search ................................. 250/225, 566, 250/568; 235/454, 462, 470, 472

[56] References Cited

U.S. PATENT DOCUMENTS

| | | | |
|---|---|---|---|
| 3,812,374 | 5/1974 | Tuhro | 250/568 |
| 4,603,262 | 7/1986 | Eastman et al. | 235/472 |
| 4,652,750 | 3/1987 | Eastman et al. | 250/568 |
| 4,820,911 | 4/1989 | Arackellian et al. | 235/467 |
| 4,874,936 | 10/1989 | Chandler et al. | 235/494 |
| 4,877,949 | 10/1989 | Danielson et al. | 235/462 |
| 4,896,029 | 1/1990 | Chandler et al. | 235/494 |
| 4,988,852 | 1/1991 | Krishnan | 235/462 |
| 4,998,010 | 3/1991 | Chandler et al. | 235/494 |
| 5,010,241 | 4/1991 | Butterworth | 235/454 |
| 5,019,699 | 5/1991 | Kosack | 235/472 |
| 5,124,537 | 6/1992 | Chandler et al. | 235/462 |
| 5,149,948 | 9/1992 | Chisholm | 235/462 |
| 5,155,343 | 10/1992 | Chandler et al. | 235/462 |
| 5,177,346 | 1/1993 | Chisholm | 235/470 |
| 5,189,292 | 2/1993 | Batterman et al. | 235/494 |
| 5,227,642 | 7/1993 | Shimizu | 250/566 |
| 5,241,166 | 8/1993 | Chandler | 235/494 |
| 5,399,852 | 3/1995 | Zheng et al. | 250/225 |
| 5,408,084 | 4/1995 | Brandorff et al. | 250/566 |

FOREIGN PATENT DOCUMENTS

| | | | |
|---|---|---|---|
| 0449634A2 | 10/1991 | European Pat. Off. | G06K 7/10 |
| 0450878A1 | 10/1991 | European Pat. Off. | G06K 7/10 |
| 0524029A2 | 1/1993 | European Pat. Off. | G06K 7/10 |

*Primary Examiner*—Stephone B. Allen
*Attorney, Agent, or Firm*—Seed and Berry LLP

[57] ABSTRACT

A symbology reader which reduces the effects of specular reflection. A plurality of illumination sources emit light toward a target object. A first polarization filter receives the unpolarized light from the illumination sources and transmits only light polarized in a first direction. Light reflected from the target object travels back to the reader where it is received by a second polarizer which is oriented to block light polarized in the first direction and transmit only light polarized in a second direction orthogonal to the first polarization direction. Non-specularly reflected light reflected from the target object is largely transmitted by the second polarizer to a detector assembly within the symbology reader. In one embodiment the polarization filters are part of a window which covers an output aperture of the reader. The polarization filters are implemented as discrete pieces of laminar polarizing film attached to a transparent window base. In an alternative embodiment, a wavelength filter is employed to block ambient light at wavelengths other than the wavelength of the illumination sources to improve the sensitivity of the detector assembly to reflected illumination light.

12 Claims, 2 Drawing Sheets

SYMBOLOGY READER WITH REDUCED SPECULAR REFLECTION

TECHNICAL FIELD

This invention relates to the field of optical symbology readers and more particularly to illumination systems for area-type symbology readers.

BACKGROUND OF THE INVENTION

Optical symbology readers detect and identify optical signals reflected from a symbology on a target object. To perform this function, symbology readers usually require an illuminating light source to illuminate the target object. An area-type symbology reader simultaneously receives and detects light from a large area of the target object which encompasses a significant portion of a symbology. For adequate illumination a wide field illumination source or a plurality of sources is used, usually controlled by flash optics. That is, an entire region of the target object containing the symbology is illuminated for a relatively short period of time.

To detect light from a large area, detector assemblies including imaging optics and detector arrays, such as commercially available CCD arrays having a plurality of light detecting elements, are used. Each element produces an electrical signal in response to the amount of reflected light received from a portion of the illuminated target object. With a conventional bar code, a region of the symbology with low reflectance is read as a black bar and a region with high reflectance is read as white space around a bar.

A significant problem with detector assemblies is that incident light energy can be sufficiently high that all areas of the target object are reflecting the maximum readable light level of the detector assembly for a given gain. The problem is encountered when the target object has a glossy surface which reflects a substantial portion of the illumination light toward the detector assembly, even from those regions which are intended to be of relatively low reflectance. Such a surface is typically perceived as a glossy surface, and such reflection is referred to as specular reflection. If the label is glossy, even a black region of a symbology may reflect light from the illuminating light source with relatively high efficiency if the illuminating light source and detector assembly are at certain angles with respect to the symbology. This problem may be solved by reducing the gain of the detector assembly; however, such a reduction in gain will lower the signal from non-specular areas and make the nonspecular signal difficult to detect. This also increases the complexity of the reader by requiring a gain control mechanism and causes delays due to the response time of the gain control system.

A further problem with reducing the gain of the detector assembly occurs where the specular reflection due to "glossiness" of the target object is localized. That is, in some cases, the specular reflection may occur in only relatively small portions of the illuminated surface. In such situations, to solve the problem by adjusting gain, the gain of the entire detection system must be reduced to prevent a portion of the array from being saturated by the reflected light from small portions of the illuminated surface. In typical arrays, gain may not be selectively reduced only in selected portions of the arrays. Thus, in those areas where specular reflection is not present, the reduced gain with its associated reduced sensitivity may make detection of a symbology difficult.

Even adjusting gain in selected portions of the detector assembly where specularly reflected light is incident does not assure a symbology will be read correctly. The specularly reflected light may still cause the detector assembly to perceive the portion of the symbology where specular reflection occurs as a high reflectance region, where, in reality, the region is of low reflectance in a non-specular sense. Therefore, specular reflection can "wash out" the information from areas of the image. Even if the gain is selectively controlled for different portions of the array, the ability of the detector assembly to identify low reflectance regions of the symbology is impaired.

A "glossy" reflection may be reduced somewhat by providing a matte finish to the symbology; however, this typically does not eliminate the problem entirely. Further, such a finish imposes a requirement on symbologies which may be difficult to meet. For example, in thermally printed bar codes on common printing stock, a certain amount of glossiness typically results. Using a rougher printing stock to reduce reflection often degrades the performance of thermal printers and blurs edges between successive regions of high and low reflectance. As is known in the art, blurred edges reduce the accuracy with which the symbology may be detected, making this approach undesirable.

Specular reflection may also be reduced somewhat by tilting the illuminated surface or illumination source beyond the angle of specular reflection. This makes the scanning process more difficult expensive and time consuming.

SUMMARY OF THE INVENTION

A symbology reader according to the invention includes illuminating light sources positioned to emit beams of light toward a target object for illumination of an area of the target object. A first linear polarization filter positioned between the illumination sources and the target object passes light of a single polarization such that light incident upon the target object is principally polarized in a single direction. Light reflected from the target object travels to a detector assembly mounted to the symbology reader which detects the reflected light and generates an electrical signal in response. A second linear polarization filter placed between the detector assembly and the illuminated area of the target object blocks light polarized in the first direction. The second polarization filter passes light which is not polarized in the first direction. Because specularly reflected light retains its polarization upon reflection, the second polarization filter blocks a substantial portion of the specularly reflected light.

In the preferred embodiment of the invention, the illuminating light source includes a plurality of LEDs mounted to a platform and emitting light outwardly from the symbology reader toward the target object.

In one embodiment, the first and second linear polarization filters are laminar films overlaying portions of an optical window mounted to the symbology reader such that light from the illumination sources passes through a first portion of the window having a first polarization film oriented in a first direction and light reflected from the target object to the detector assembly passes through a second portion of the window having a second polarization film oriented orthogonally to the first polarization film.

In one embodiment, the optical window includes a color selective filter chosen to pass light substantially of the wavelength of the illumination sources and to block light of other wavelengths. The color selective filter thus blocks ambient light of wavelengths other than the wavelength of the illumination sources from impinging upon the detector assembly.

In an alternative embodiment of the reader, the illuminating light source emits light along an optical path toward the target object and a first linear polarization filter receives the unpolarized light from the light source and transmits only light polarized in a first plane. A quarter-wave plate positioned between the first linear polarization filter and the target object receives the linearly polarized light transmitted by the first polarization filter and converts the linearly polarized light to circularly polarized light. Depending on the direction of rotation of the electric field vector, circularly polarized light can be classified as left or right circularly polarized. The circularly polarized light travels to the target object where it is reflected.

As is known, if the circularly polarized light is specularly reflected, it remains circularly polarized, but the electric field vector will have the opposite direction of rotation. Specularly reflected (circularly polarized) light, along with any diffusely reflected light, returns to the reader where it is received by a quarter-wave plate which converts any circularly polarized light in the reflected light to linearly polarized light. If the circularly polarized light is circularly polarized in an opposite direction to that transmitted by the reader toward the target object, the linearly polarized light produced by the second quarter-wave plate will be linearly polarized in a direction orthogonal to the first polarization direction. The light from the quarter-wave plate is received by a second polarization filter which passes light in the first polarization direction and inhibits the passage of light in a second direction orthogonal to the first direction. Because any specularly reflected light from the target object will, after passing through the quarter-wave plate, be linearly polarized in the second direction, the specularly reflected light is inhibited from being transmitted to the detector assembly within the reader by the linear polarizer.

In one embodiment, the first quarter-wave plate and second quarter-wave plate are portions of a single quarter-wave plate. In another embodiment, the first and second polarization filters are portions of a single polarizer. In another alternative embodiment, a wavelength filter which selectively transmits light at the wavelength of the optical source is used to remove ambient light to improve the sensitivity of the reader.

DETAILED DESCRIPTION OF THE INVENTION

Figure 1:
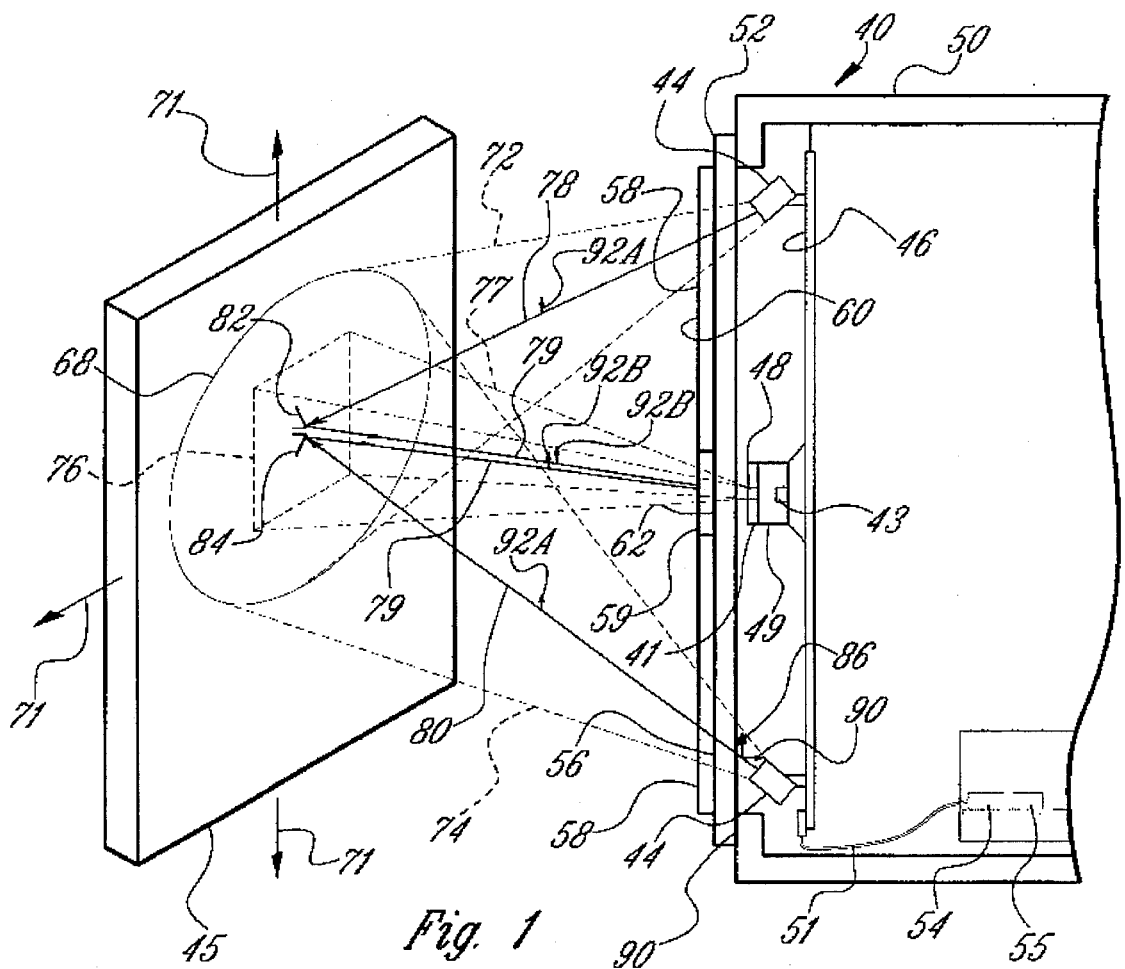
FIG. 1 is a schematic drawing illustrating the operation of a symbology reader using the invention.
Figure 2:
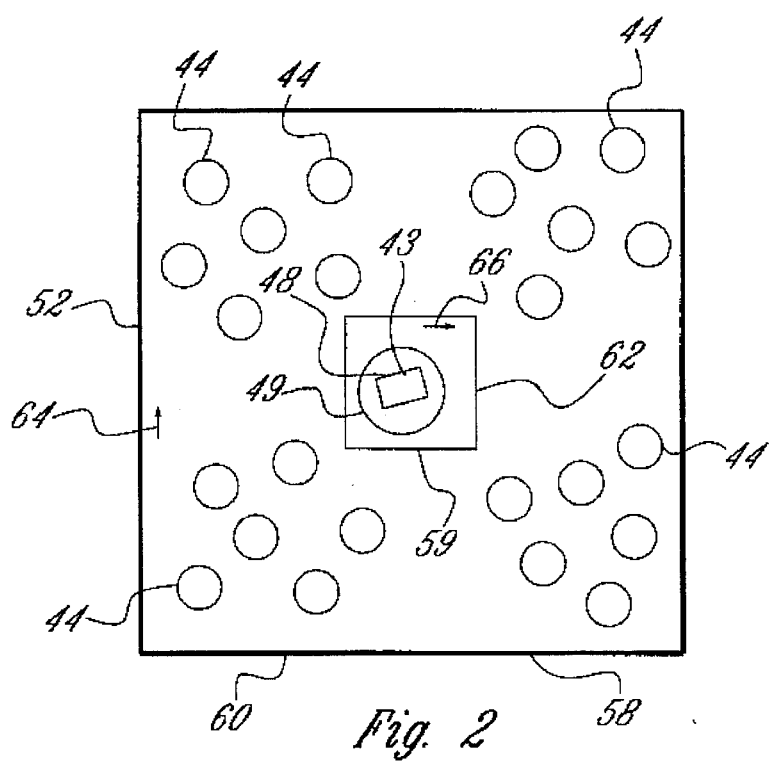
FIG. 2 is a front elevational view of a portion of the symbology reader of FIG. 1.

As shown in FIG. 1, a symbology reader 40 according to the invention includes a plurality of illumination sources 44 mounted on a platform 46 for illumination a target object 45 having a bar code or other symbology on its surface. The platform 46 is a printed circuit board mounted within a reader housing 50. The illumination sources 44 in the illustrated preferred embodiment are light emitting diodes ("LEDs") mounted to the platform 46 at selected locations and orientations to emit beams of light outwardly from the reader 40 to illuminate the target object 70. In FIG. 1, two light beams 72 and 74 are shown for purposes of illustrating each beam projecting along a different optical path toward the target object. It will be understood that although only two illumination sources 44 are illustrated in FIG. 1, in the preferred embodiment approximately twenty-four separate LEDs, as is shown in FIG. 2, are utilized; with each directed along a separate optical path toward the target object 45.

A two-dimensional detector assembly 48 including a detector array 43 and imaging optics 41 is also mounted to a central portion of the platform 46 and provides a means for the reader to detect light reflected from the target object 45. The detector array 43 is a conventional CCD array. The detector assembly 48 is oriented to receive a portion of the light entering within the housing 50 through a window 52.

The illumination sources 44 and detector assembly 48 are powered by a conventional electronic controller 54 under control of a microprocessor 55. Connection of the detector assembly 48 and the illumination sources 44 to the electronics and microprocessor is achieved by cabling 51 which connects to the printed circuit board forming the platform 46.

The window 52 provides a passageway for light from the illumination sources 44 to be emitted from the reader 40 toward the target object 45. The window 52 also provides access for reflected light to pass from the target object to the detector assembly 48.

The window 52 includes a transparent base 56 over which a pair of laminar polarization filters 58 and 59 are attached. The polarization filters 58 and 59 are linear polarization filters formed from two separate portions of polarizing film, each covering a separate surface region 60 and 62, respectively, of the window base 56, as can be seen most clearly in FIG. 2. The first region 60 includes a substantial portion of the window 52 in front of the illumination sources 44. The second region 62 includes a central portion of the window 52 in front of the detector assembly 48. Such polarizing films are commercially available products which include a transparent adhesive backing for attachment to a surface, such as the window base 56. Alternatively, the polarization filters may be integral to the base or may be formed from polarizing coatings deposited on the base. While the embodiment of FIG. 1 is shown using linear polarization filters 58, 60, other types of polarizers are within the scope of the invention.

As shown in FIG. 2, the polarization filter 58 in front of the illumination sources 44 selectively transmits light polarized in a first direction, shown by arrow 64, and the polarization filter 59 in front of the detector assembly 48 selectively transmits light polarized in a second direction, shown by arrow 66, orthogonal to the first polarization direction of the polarization filter 58. This configuration is easily achieved by cutting from a single sheet of polarizing film two pieces correspondingly sized to the first and second regions 60 and 62. Prior to attachment to the window base 56, one of the two pieces is rotated 90°. Both pieces are attached to the window base 56.

Operation of the reader 40 will now be described, making primary reference to FIG. 1. The reader 40 illuminates an image plane 71 with the illumination sources 44, as illustrated by the two light beams 72 and 74, to generally uniformly illuminate a region 68 of the target object 45. The reader 40 then detects, with the detector assembly 48, light reflected from an image area 76 of the illuminated region 68 in the image plane 71.

The amount of light reflected from each location of the target object 45 in the image area 76 will depend, in large part, upon the reflectance of the target object 45 at that location or the bar code or other symbology applied thereto by a label or direct printing of the symbology on the surface of the target object 45. Thus, the amount of light received from each location by the detector assembly 48 will be proportional to the reflectance at that location. In response to the light received from each location, the detector assembly 48 generates electrical signals indicative of the amount of light energy. Because a symbology is a predetermined pattern of high and low reflectances, the detector assembly 48 will generate a pattern of electrical signals corresponding to any symbology within the image area 76. The electrical output from the detector assembly is input to the electronic controller 54 and the microprocessor 55. The electrical output may be stored in memory and then decoded by the microprocessor, as is known in the art, to locate and decode any symbology which may be present in the image area 76.

In general, the light generated by the illumination sources 44 is unpolarized. It will be understood by one skilled in the art that the term "unpolarized light" as used herein does not necessarily refer to light having no polarization at all. That is, unpolarized light is not used to refer to light in which the electric fields in the two orthogonal directions are necessarily completely uncorrelated. Rather, unpolarized is used herein to describe light which is not principally linearly polarized in a specific plane. A more detailed description of polarization and the distinction between polarized and unpolarized light, is found in A. Ishimaru, Electromagnetic Wave Propagation, Radiation and Scattering, at 33–40, Prentice-Hall, Inc. (1991).

As discussed above, the detection and identification of a symbology will be impaired by any specularly reflected light that returns to the detector assembly 48. While the light produced by the illumination sources 44 passes through the polarization filter 58, some of the polarizing light incident upon the image area 76 will be reflected in a specular fashion toward the detector assembly 48. As is known, specular reflection refers to reflection in which the light retains its polarization upon reflection from a surface. For example, if light is linearly polarized in a first direction, it will retain its linear polarization in that same direction upon specular reflection. It will also be understood by one skilled in the art that FIG. 1 is a representational presentation of specular reflection from discrete locations on the target object using rays to represent beams of light and arrows to indicate polarization.

The phenomenon of specular reflection may actually occur in any portion of the image area 76 or over the entire image area. The amount of specular reflection of the light from the illumination sources 44 toward the detector assembly 48 will depend upon the angle of incidence and the angle of reflection of the light as dictated by the relative positions of the detector assembly 48, the illumination sources 44 and the image area 76 of the target object 70, the topography and finish of the target object, and the orientation of the surface of the target object in the image area, including any uneven regions.

The reader 40 produces polarized light indicated by light beams 78, 80. The polarized nature of the light beams 78, 80 resulting from their passage through polarization filter 58 is represented by the polarization direction arrows 92. Initially, the light emitted from the illumination sources 44 is largely unpolarized light as indicated by the dual polarization direction arrows 86 and 90 in FIG. 1. As the unpolarized light from the illumination sources 44 passes through the first polarization filter 58, light polarized orthogonally to the first polarization direction 64 (see FIG. 2) is blocked. Only polarized light in the light beams 78, 80 having a polarization direction parallel to the first polarization direction 64 is transmitted, which is indicated by the polarization direction arrows 92A. The polarized light then travels to the target object 45.

Upon striking and illumination the region 68 of the target object 45, some percentage of the incident polarized light from the light beams 78, 80 is reflected and returned as reflected light, indicated by reference numeral 77 and the broken lines in FIG. 1, toward the detector assembly 48 from the target object. Part of this reflected light 77 will be specularly reflected light, indicated by light beams 79, from specular regions 82, 84, indicated as triangular projections on the target object 45. Some of the specularly reflected light 79 will follow an optical path back toward the detector assembly 48.

As is characteristic of specular reflection, the specularly reflected light 79 retains its polarization in the first polarization direction 66, as indicated by the polarization direction arrows 92B. The reflected light 77, including both specularly reflected light 79 and non-specularly reflected light, travels from the target object 45 toward the detector assembly 48 and passes through the second region 62 of the window base 56 covered by the second polarization filter 59. The second polarization filter 59 blocks substantially all light polarized in the first polarization direction 64, which is transverse to the second polarization direction 66, while transmitting light polarized in the second polarization direction 66 to the detector assembly 48. Thus, a substantial portion of the light which is specularly reflected from the target object 45 toward the detector assembly 48 is blocked from reaching the detector assembly 48 by the second polarization filter 59.

It should be noted that, while some of the incident polarized light from the light beams 78, 80 is specularly reflected, a significant portion of the light is reflected in a non-specular, or diffuse, manner. That is, a significant portion of the light which is reflected does not retain linear polarization in the first polarization direction 64 and will be, at least partially, unpolarized. A portion of this unpolarized light polarized in the second polarization direction 66 is transmitted by the polarization filter 59 to the detector assembly 48. The detector assembly 48 therefore receives diffusely (non-specularly) reflected light originating from the illumination sources 44 while the specularly reflected light is blocked. This diffusely reflected light more accurately represents the reflectance of the different region of the image area 76, improving the accuracy with which the reader 40 reads any symbology in the image area 76.

While the base 56 of the window 52 of the preferred embodiment is transparent, it will be understood that a color selective filter may be used in place of, or in addition to, the transparent base. As is known, a color selective filter having a passband overlapping the wavelength of the illumination sources 44 advantageously will pass only light substantially of the wavelength of the light from the illumination sources 44 while blocking light at other wavelengths. Consequently, ambient light at wavelengths other than the wavelength of the light from the illumination sources 44 is prevented from impinging on the detector assembly 48 and impairing its sensitivity. This inhibits reduction of sensitivity of the detector assembly 48 by ambient light.

An alternative embodiment of the invention relies upon the circular polarization properties of light. In this embodiment, illustrated in FIG. 3, a linear polarizer 100 is positioned in the optical path of illumination sources 44 to transmit linearly polarized light 80 toward the target object 45, as described above.

Figure 3:
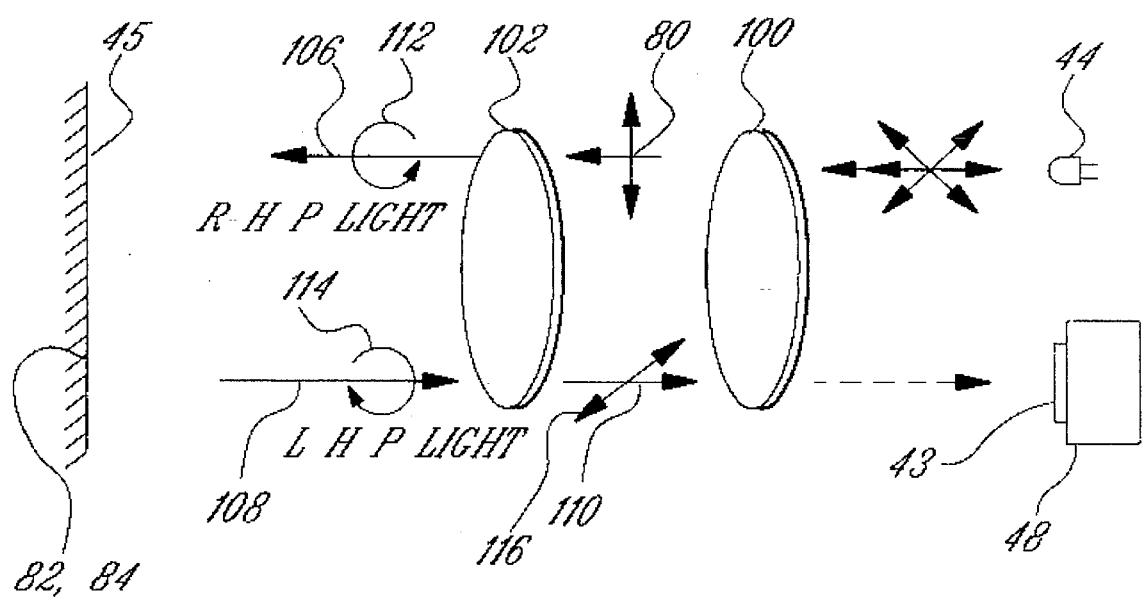
FIG. 3 is a representational isometric view of an alternative embodiment of the invention employing a linear polarizer and a quarter-wave plate.

A quarter wave plate 102 of a known construction overlays the linear polarizer 100 and receives the light transmitted by the linear polarizer 100. As is known, the quarter wave plate 102 converts linearly polarized light to circularly polarized light. Depending upon the polarization direction of the linearly polarized light, the circularly polarized light will have either a left or right hand rotation of the electric field vector. In the embodiment of FIG. 3, the light 106 transmitted by the quarter wave plate 102 is right hand polarized as indicated by the circular polarization indicator 112.

As is known, when the circularly polarized light 106 is reflected by specular regions 82, 84 of the target object 45, it will change the handedness of the polarized light. In the example of FIG. 3, where the incident circularly polarized light is right hand polarized (RHP) light 106, the specularly reflected light is then left hand polarized (LHP) light 108 as indicated by the circular polarization indicator 114. The LHP light 108 encounters the quarter wave plate 102 as it returns to the detector assembly 48. The quarter wave plate converts the LHP light 108 to linearly polarized light 110, as indicated by the polarization indicator 116. The linearly polarized light 110 will have its polarization axis orthogonal to the polarization axis of the linear polarizer 100. Thus, the returning specularly reflected light 108 will be blocked from reaching the detector assembly 48. As with the embodiment of FIG. 1, diffusely reflected light (i.e., non-specularly reflected light) will have random polarization orientations and therefore some of it will be transmitted by the quarter wave plate 102 and the linear polarizer 100. Consequently, the specularly reflected light 108 will be removed while diffusely reflected light will be transmitted to the detector assembly 48.

Advantageously, the quarter wave plate 102 and linear polarizer 100 can be made of one part and do not require cutting of a polarization film to produce first and second polarizers. This reduces fabrication costs.

As with the embodiment of FIGS. 1 and 2, the window formed by the quarter wave plate 102 and the linear polarizer 100 can be made color selective by making either, or both, of the linear polarizer 100 or the quarter wave plate 102 from a color selective material. Alternately, a separate color filter may be used to selectively transmit light at the wavelength of the optical source 44 to the detector assembly 48 while blocking light at other wavelengths.

It will be understood by one skilled in the art that although polarization filters formed from laminar films overlaying an optical window are preferred, other polarization filters positioned between the illumination sources and the image plane and between the detector assembly and the image plane are within the scope of the invention. Further, although the preferred embodiment employs a plurality of illumination sources 44 for providing illumination of the target object 45, a device employing a single optical source is within the scope of the invention. It will be appreciated that, although a specific embodiment of the invention has been described herein for purposes of illustration, various modifications may be made without departing from the spirit and scope of the invention. Accordingly, the invention is not limited except as by the appended claims.

I claim:

1. A window for reducing specular reflections, mountable in a symbology reader, the symbology reader having an illuminating light source within a housing producing a beam of unpolarized light directed along a predetermined optical path toward a target object for illumination a symbology on the target object, and a detector assembly for receiving light reflected by the symbology in the optical path, comprising:

a planar lens mountable to the housing, the lens including a first area and a second area, the first area being positioned in the optical path, and the second area being positioned between the target object and the detector assembly to receive light reflected from the target object when illuminated by the light source;

a first polarizer at the first area of the lens, the first polarizer being oriented to transmit light substantially of a first polarization; and a second polarizer at the second area of the lens, the second polarizer being oriented to transmit light of a second polarization substantially orthogonal to the first polarization.

2. The window of claim 1 wherein the planar lens is composed of a base of transparent first material and wherein each of the first and second polarizers is a laminar film overlaying the lens base.

3. The window of claim 1 wherein the planar lens is composed of a base of filtering material, the filtering material transmitting light within a selected band of wavelengths and substantially blocking light outside of the selected band, and wherein each of the first and second polarizers is a laminar film overlaying the lens base.

4. A symbology reader for reading a symbology on a region of a target object, the symbology having a plurality of areas of different reflectance, comprising:

an illuminating light source for producing light polarized in a first circular polarization direction, the light source being oriented to emit the circularly polarized light along an optical path toward the region of the target object;

a first optical element positioned to receive light reflected from the region of the target object, the first optical element converting the reflected circularly polarized light to linearly polarized light polarized in a first direction;

a first polarizer positioned to receive light from the first optical element, the first polarizer transmitting light linearly polarized substantially in the first direction and inhibiting the passage of light linearly polarized substantially in a second direction orthogonal to the first direction; and an optical detector assembly positioned to receive the light linearly polarized in the first direction transmitted by the first polarizer and producing electrical signals in response to light transmitted by the first polarizer wherein the illuminating light source includes:

a light source for producing unpolarized light and oriented to emit unpolarized light along the optical path;

a second polarizer in the optical path to receive the unpolarized light from the light source, the second polarizer transmitting light linearly polarized substantially in the first direction and inhibiting the passage of light polarized substantially in the second direction; and a second optical element positioned to receive linearly polarized light from the second polarizer, the second optical element converting the light linearly polarized in substantially the first direction to circularly polarized light polarized in the first circular polarization direction and transmitting the circularly polarized light to the region of the target object.

5. The symbology reader of claim 4 wherein the first polarizer comprises a first portion of the optical window interposed between the region of the target object and the detector assembly and the second polarizer comprises a second portion of an optical window positioned in the optical path.

6. The symbology reader of claim 4 wherein the first optical element comprises a first portion of a quarter wave plate interposed between the region of the target object and the detector assembly and the second optical element comprises a second portion of the quarter wave plate positioned in the optical path.

7. The symbology reader of claim 6 wherein the first polarizer comprises a first portion of the optical window interposed between the region of the target object and the detector assembly and the first polarizer comprises a second portion of an optical window positioned in the optical path.

8. The symbology reader of claim 7, further including a wavelength selective optical filter interposed between the region of the target object and the detector assembly, the filter preferentially passing light at wavelengths of the light emitted by the LEDs.

9. The symbology reader of claim 4 wherein the illuminating light source includes:

a light source for producing unpolarized light, the unpolarized light source being oriented to direct the unpolarized light through the first polarizer to produce light polarized in the first direction, the unpolarized light source and the first polarizer being oriented such that the light polarized in the first direction from the first polarizer is directed through the first optical element for conversion to light circularly polarized in the first circular polarization direction.

10. A symbology reader, comprising:

a housing;

a window for reducing specular reflections, mountable in the symbology reader;

an illuminating light source within the housing producing a beam of unpolarized light directed along a predetermined optical path toward a target object for illuminating a symbology on the target object; and a detector assembly for receiving light reflected by the symbology in the optical path;

wherein the window includes:

a lens mountable to the housing, the lens including a first area and a second area, the first area being positioned in the optical path, and the second area being positioned between the target object and the detector assembly to receive light reflected from the target object when illuminated by the light source;

a first polarizer at the first area of the lens, the first polarizer being oriented to transmit light substantially of a first polarization; and a second polarizer at the second area of the lens, the second polarizer being oriented to transmit light of a second polarization substantially orthogonal to the first polarization.

11. The window of claim 10 wherein the lens is composed of a base of transparent first material and wherein each of the first and second polarizers is a laminar film overlaying the lens base.

12. The window of claim 10 wherein the lens is composed of a base of filtering material, the filtering material transmitting light within a selected band of wavelengths and substantially blocking light outside of the selected band, and wherein each of the first and second polarizers is a laminar film overlaying the lens base.

* * * * *